(12) United States Patent
Dubhashi

(10) Patent No.: US 6,570,359 B2
(45) Date of Patent: May 27, 2003

(54) MOTOR STARTING CIRCUIT

(76) Inventor: Umakant Dipa Dubhashi, 2401 Rockefeller La., Redondo Beach, CA (US) 90278

( * ) Notice: Subject to any disclaimer, the term of this patent is extended or adjusted under 35 U.S.C. 154(b) by 0 days.

(21) Appl. No.: 09/878,732

(22) Filed: Jun. 11, 2001

(65) Prior Publication Data

US 2002/0005700 A1 Jan. 17, 2002

Related U.S. Application Data

(60) Provisional application No. 60/218,512, filed on Jul. 15, 2000.

(51) Int. Cl.[7] .................................................. H02P 1/44
(52) U.S. Cl. ....................... 318/786; 318/430; 318/787; 318/788
(58) Field of Search ................... 318/778, 781, 318/785, 786, 787, 788, 430, 431, 434

(56) References Cited

U.S. PATENT DOCUMENTS

| | | | | |
|---|---|---|---|---|
| 3,071,717 A | * | 1/1963 | Gordon | |
| 3,116,445 A | * | 12/1963 | Wright | |
| 3,226,620 A | * | 12/1965 | Elliott et al. | |
| 3,549,970 A | * | 12/1970 | Lewus | |
| 3,573,579 A | * | 4/1971 | Lewus | |
| 3,644,810 A | * | 2/1972 | Lewus | |
| 3,657,619 A | * | 4/1972 | Love | |
| 3,657,621 A | * | 4/1972 | Fink, Jr. et al. | |
| 3,696,281 A | | 10/1972 | Gramkow et al. | |
| 3,746,951 A | | 7/1973 | Hohman | |
| 3,916,274 A | * | 10/1975 | Lewus | |
| 4,047,082 A | | 9/1977 | Scheuer et al. | |
| 4,307,327 A | * | 12/1981 | Streater et al. | 318/786 |
| 4,486,700 A | * | 12/1984 | Kawate et al. | 318/781 |
| 4,574,229 A | * | 3/1986 | Kim | 318/788 |
| 4,651,077 A | | 3/1987 | Woyski | |
| 4,820,964 A | * | 4/1989 | Kadah et al. | 318/786 |
| 4,843,295 A | | 6/1989 | Thompson et al. | |
| 5,451,853 A | | 9/1995 | Itoh | |
| 5,559,418 A | | 9/1996 | Burkhart | |
| 5,811,955 A | | 9/1998 | Kachuk | |
| 5,898,289 A | | 4/1999 | Hamatani | |
| 6,034,503 A | | 3/2000 | Pertessis | |

OTHER PUBLICATIONS

Gating, Latching, and Holding of SCRs and Triacs, Teccor Electronics, Inc., AN1002. (Date unknown).

Fact Sheet 013. Understanding Hi–Com Triacs, Thyristors and Triacs, Technical Publications, Philips Semiconductors, Oct. 1997, Document No. 939851021011.

* cited by examiner

*Primary Examiner*—Bentsu Ro
(74) *Attorney, Agent, or Firm*—Ostrolenk, Faber, Gerb & Soffen, LLP

(57) ABSTRACT

A starting circuit for a single phase motor having a main winding and a starting winding has a triac in series with the starting winding, and a current sense device in series with the main winding. The current sense device is a NTC resistor or current transformer with a saturable core, and puts out a single to turn on the triac during starting, and removes the triac turn on signal when the main winding energization is sufficiently high to run the motor without the starter winding itself.

3 Claims, 3 Drawing Sheets

MOTOR STARTING CIRCUIT

RELATED APPLICATIONS

This application claims the benefit of U.S. Provisional Application No. 60/218,512, filed Jul. 15, 2000.

FIELD OF THE INVENTION

This invention relates to motor starting circuits and more specifically relates to a control circuit for controlling the energization of the starting capacitor and starting winding of a single phase motor.

BACKGROUND OF THE INVENTION

Single phase AC induction motors have a subclass that utilize a starting winding, and sometimes, a starting capacitor in series with the winding to generate a rotating magnetic field. In most such motors the starting capacitor and the starting winding circuit is cut off from the supply after the motor reaches about 75 to 80% of its rated speed, when the motor main winding alone provides sufficient operating torque. If the supply voltage remains connected to the start winding and the capacitor, the capacitor and the winding need to be significantly larger and more robust, and thus more expensive. Therefore, most such motors have a switch that turns off the supply voltage to this branch after starting.

This added switch is expensive, slow and bulky. It would be desirable to provide a high speed, inexpensive and reliable control arrangement for disconnecting the starting winding and starting capacitor from the power line when the main motor winding reaches a predetermined energization from the power line.

BRIEF DESCRIPTION OF THE INVENTION

In accordance with the invention, a current sensor is coupled to the main motor winding and is arranged to put out a signal which is indicative of the energization state of the main winding, for example, a measure of the current in the main winding. A controllably conductive solid state switching device such as a triac, a bipolar transistor or pairs of antiparallel connected SCRs, power MOSFETs or IGBTs are then connected in series with the starting winding and are operated into and out of conduction by the current sensor in such a way that the device is switched on during motor starting, but is switched off when the main motor winding is energized sufficiently as to provide its own operating torque.

Thus, the sensor output must be high at low motor current to turn on the controllably conductive device, but its output must decrease as the motor current increases to its self-sustaining value, at which point the controllably conductive device turns off to open the starting winding circuit. In this way, the starting winding and starting capacitor can be reduced to a small fraction of their required size if they were permanently left in the circuit.

In accordance with the invention, the current sensor may be made of a negative temperature coefficient (NTC) resistor or a saturable current transformer in series with the main winding; or a resistor network which carries the locked rotor current of the main winding. Other similar devices which will produce a desired preprogramed output can also be used.

In each case, the novel circuits require low volume and require little power and are highly reliable and inexpensive.

BRIEF DESCRIPTION OF THE DRAWINGS

FIGS. 5A to 5E are characteristic curves on a common time base in which, FIG. 5A shows the main motor winding current; FIG. 5B shows the thermal and resistance characteristics of the NTC of FIG. 3; FIG. 5C shows the voltage drop across the NTC of FIG. 3; FIG. 5D shows the absolute value of the CT output voltage of FIG. 4; and FIG. 5E shows the on/off state of the triac of FIGS. 2, 3 and 4.

DETAILED DESCRIPTION OF THE PREFERRED EMBODIMENTS

Figure 1:
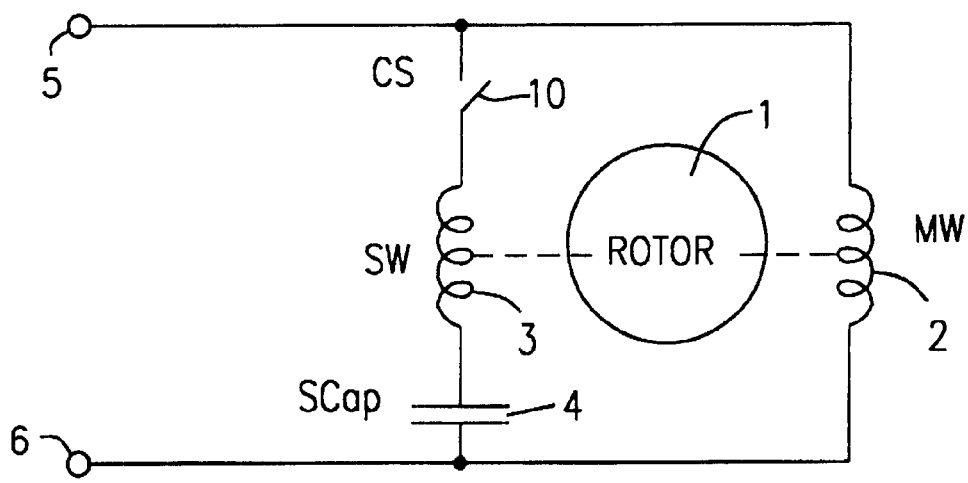
FIG. 1 is a circuit diagram of a prior art motor starting circuit.

Referring first to FIG. 1, there is shown a single phase motor having a rotor 1, a main winding (MW) 2, and a starting winding (SW) 3. A starting capacitor (S cap) 4 is frequently and optionally connected in series with starting winding 3. A pair of a-c terminals 5 and 6 are connected across both winding 2 and 3 as shown. A switch (CS) 10 is connected in series with terminals 5, 6 and winding 3. An operating means (not shown) is provided to open switch 10 at some time after the motor main winding 2 provides sufficient torque to operate without the starting winding, usually occurring at about 75 to 80% of rated rotor speed.

In accordance with the invention, the winding 3 is cut-out in a low cost fashion. Thus, referring to FIG. 2, where, as in all remaining FIGS., the same numeral is used to designate a similar part, a triac (T) 20 is provided in place of switch 3. A resistance network is provided, consisting of resistors 21 and 22 which are connected in series with main winding 2 and couple the signal related to motor current to the gate of triac 20.

Triac 20 is the main switching element in series with the starting winding 3 and the capacitor 4. Triac 20 is controlled by the current fed into its gate. This gate current is the result of the voltage drop produced by current flowing into the main winding 2 through resistor 22. At startup, there is a large current in the main winding 2 as there is no back emf due to the rotor because the rotor is stationary. Consequently a large current, known as the "locked rotor current" flows through the main winding. This current results in a voltage drop across the resistor 22. If the voltage across resistor 22 is sufficiently high, some current flows through resistor 21 and into the gate of triac 20 which causes it to turn ON.

Figure 5A:
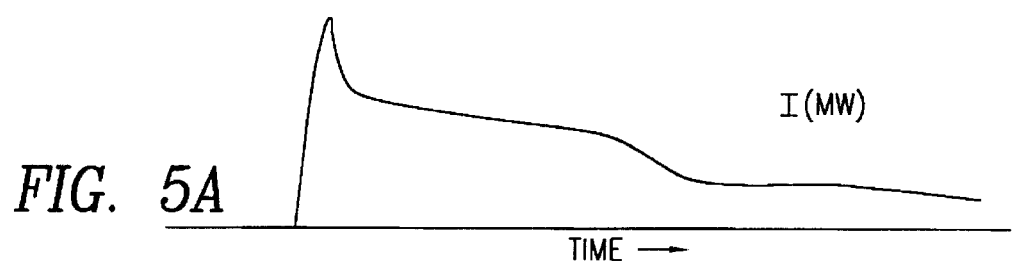
Figure 5B:
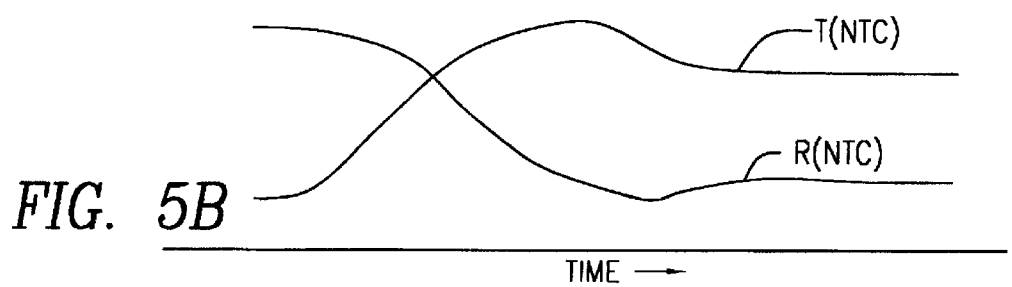
Figure 5C:
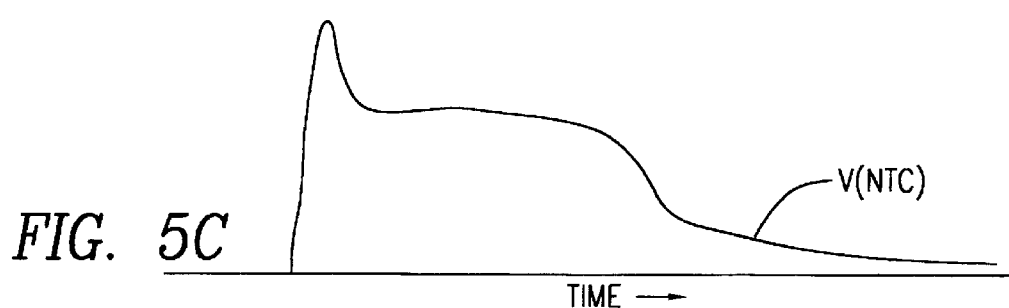
Figure 5D:
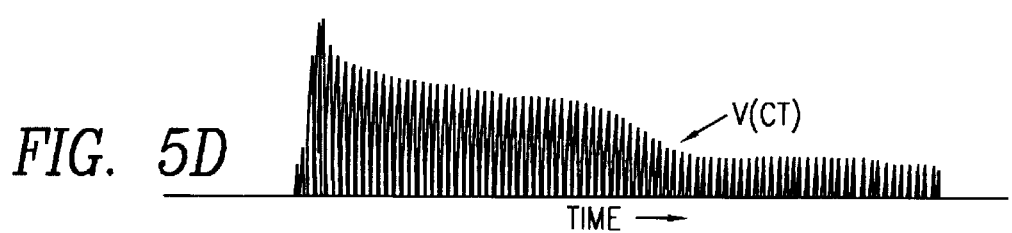
Figure 5E:
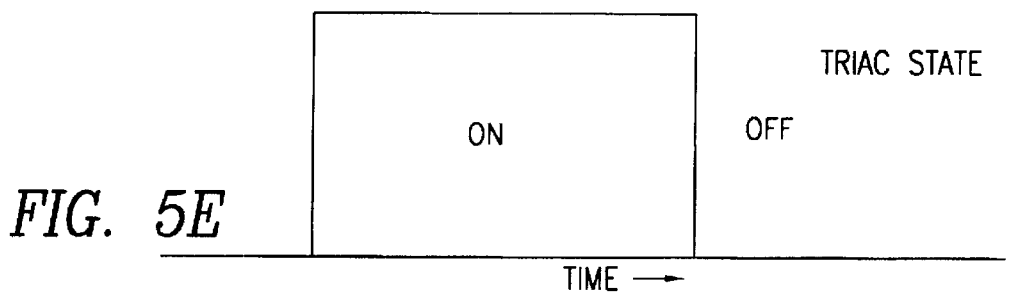

As shown in FIGS. 5A and 5E (envelopes of the quantities that vary at the mains frequencies), as the current $I_{MW}$ in the main winding 2 drops, the gate voltage on the triac 20 drops and thus eventually the triac 20 is turned off. This shuts off the application of voltage from terminal 5, 6 to the start winding 3 and capacitor 4 (if any) as desired. The values of resistors 21 and 22 are chosen to provide the desired cut off point depending on the currents in the motor and the triac's characteristics.

Figure 2:
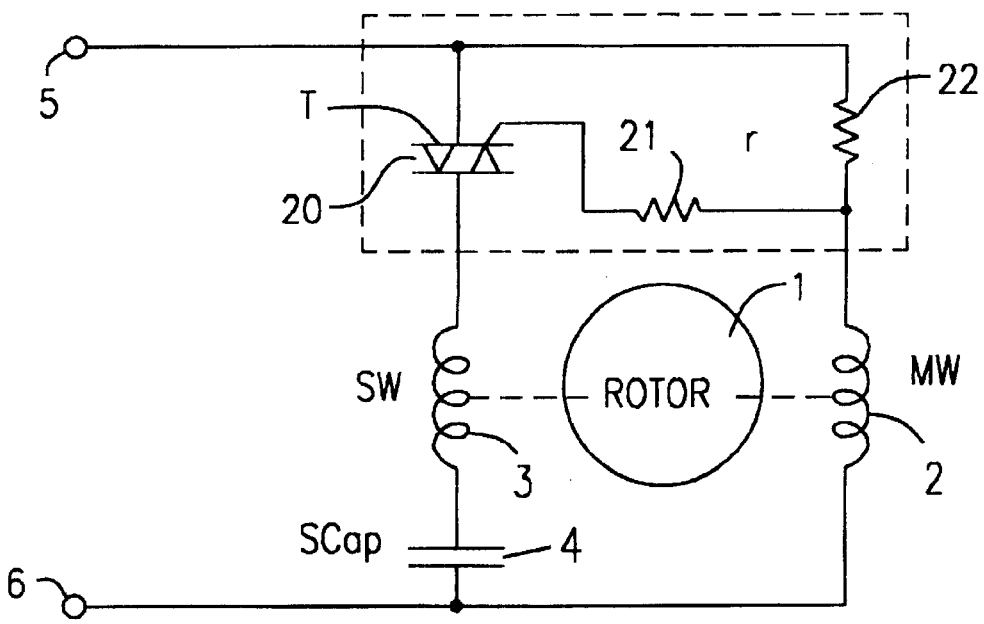
FIG. 2 is a circuit diagram of a first embodiment of the invention.
Figure 3:
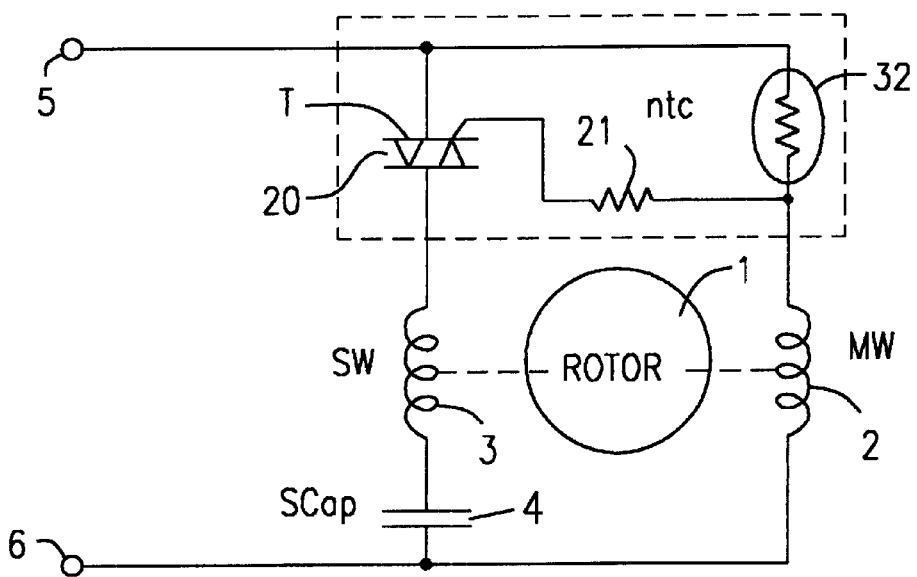
FIG. 3 is a circuit diagram of a second embodiment of the invention.

FIG. 3 shows a second embodiment of the invention. The resistor 22 in FIG. 2 is replaced by an negative temperature coefficient (NTC) resistor 32 whose resistance decreases as it gets hotter as shown in FIG. 5B. When it is cool, the large startup current $I_{MW}$ causes enough voltage across resistor 32 to divert enough current into the triac 20 gate to turn it ON thereby applying voltage to the starting winding plus capacitor. The advantage of the NTC resistor 32 is that its temperature increases and thus its resistance decreases due to the current $I_{MW}$ flowing through it. The decrease in resistance reduces the voltage across resistor 32. This results in a more rapid reduction in current into the gate of triac 20. This novel circuit then results in a construction that is more tolerant to variations in motor construction and triac characteristics.

Figure 4:
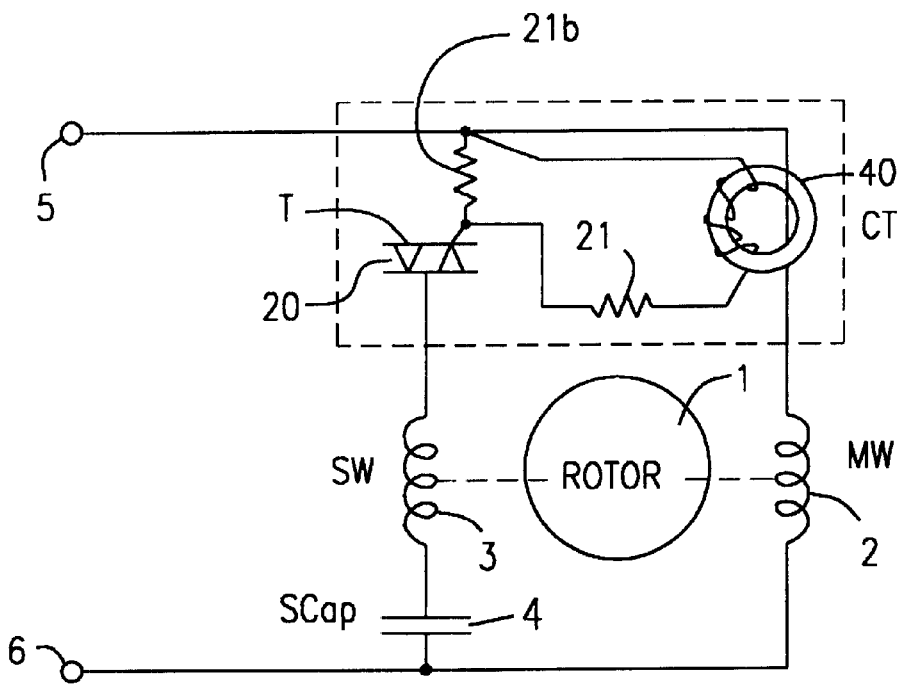
FIG. 4 is a circuit diagram of a third embodiment of the invention.

A third embodiment of the invention is shown in FIG. 4. In this case, the resistor 32 or the NTC is replaced by a current transformer 40. In the embodiments of FIGS. 2 and 3, the resistor 22 and the NTC 32 are always in the start winding 3 of the motor and thus cause unintended losses. This may not be desirable in some energy saving applications. The current transformer 40 has virtually no losses while it converts the current $I_{MW}$ in the winding 2 into a lower current which flows through the NTC resistor 21b. Resistor 21b is a small low cost NTC resistor of appropriate value. The voltage across this resistor is proportional to the Imw and is inversely related to its temperature. As the current Imw reduces in time and its temperature increases the voltage across resistor 21b, it will drop below the level required to keep the Triac ON and thus the Triac will turn off. As the coupling occurs by magnetic means, it is possible to use a properly designed saturable current transformer to reduce cost as the triac 20 can be turned ON by just a brief pulse of current through its gate. Thus, the CT 40 may saturate after a short time in each half cycle whereby its output current drops and it ceases to feed the triac's gate.

Although the present invention has been described in relation to particular embodiments thereof, many other variations and modifications and other uses will become apparent to those skilled in the art. It is preferred, therefore, that the present invention be limited not by the specific disclosure herein

What is claimed is:

1. A control circuit for a motor; said motor having a rotor, a main winding and a starter winding coupled to a common voltage source and each operable to cause rotation of said rotor; said motor winding developing sufficient torque to run said rotor continuously after a given time following the energization of said motor from said voltage source; said control circuit including a controllably conductive semiconductor device; said controllably conductive semiconductor device having a control electrode and having main electrodes connected in series with said voltage source and said starter winding; and a current sense structure connected in series with said main winding for measuring the degree of energization of said motor rotor by said main winding after the application of electrical power to said main winding; and a coupling circuit coupling the output of said current sense structure to said control electrode of said controllably conductive device; the output of said current sense structure being arranged whereby said controllably conductive device is turned on when said motor is started and is turned off when said motor is capable of running under the energization of said main winding only; wherein said controllably conductive device is selected from the group consisting of transistors, SCRs, triacs, MOSFETs, and IGBTs, and said current sense structure includes a current transformer and an NTC resistor coupled between the output of said current sense transformer and the control electrode of said controllably conductive device.

2. The circuit of claim 1, wherein said current sense structure includes a current transformer having a saturable core.

3. The circuit of claim 1, which further includes a starting capacitor connected in series with said starter winding and said controllably conductive device.

* * * * *